United States Patent
Park et al.

(10) Patent No.: US 10,546,685 B2
(45) Date of Patent: Jan. 28, 2020

(54) WIRELESS POWER TRANSMITTING APPARATUS

(71) Applicant: LG INNOTEK CO., LTD., Seoul (KR)

(72) Inventors: Jay Park, Seoul (KR); Soon Young Hyun, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/405,746

(22) Filed: May 7, 2019

(65) Prior Publication Data

US 2019/0267185 A1    Aug. 29, 2019

Related U.S. Application Data

(63) Continuation of application No. 15/835,009, filed on Dec. 7, 2017, now Pat. No. 10,361,026, which is a continuation of application No. 14/677,164, filed on Apr. 2, 2015, now Pat. No. 9,871,383.

(30) Foreign Application Priority Data

Apr. 3, 2014    (KR) .................. 10-2014-0040009

(51) Int. Cl.
*H01F 27/36* (2006.01)
*H02J 50/70* (2016.01)
(Continued)

(52) U.S. Cl.
CPC ......... *H01F 27/365* (2013.01); *H01F 27/255* (2013.01); *H01F 27/2871* (2013.01);
(Continued)

(58) Field of Classification Search
CPC .. H01F 27/365; H01F 27/255; H01F 27/2871; H01F 38/14; H02J 50/12;
(Continued)

(56) References Cited

U.S. PATENT DOCUMENTS

| 9,608,697 | B2 | 3/2017 | Jung et al. |
| 9,906,274 | B2 | 2/2018 | Jung et al. |

(Continued)

FOREIGN PATENT DOCUMENTS

| CN | 101064207 A | 10/2007 |
| CN | 101630562 A | 1/2010 |

(Continued)

*Primary Examiner* — Daniel C Puentes
(74) *Attorney, Agent, or Firm* — Birch, Stewart, Kolasch & Birch, LLP

(57) ABSTRACT

A wireless power transmitting apparatus can include a first transmitting coil; a second transmitting coil; a third transmitting coil on the first transmitting coil and the second transmitting coil; and a substrate to accommodate the first transmitting coil, the second transmitting coil, and the third transmitting coil, in which the substrate includes a wall to surround a part of an outer circumference of the first transmitting coil and a part of an outer circumference of the second transmitting coil; a first protrusion to surround a first part of an outer circumference of the third transmitting coil; and a second protrusion to surround a second part of the outer circumference of the third transmitting coil, in which the first protrusion comprises a first stepped portion to support the third transmitting coil, and the second protrusion comprises a second stepped portion to support the third transmitting coil.

18 Claims, 6 Drawing Sheets

(51) Int. Cl.
    *H01F 38/14*     (2006.01)
    *H02J 50/12*     (2016.01)
    *H02J 50/50*     (2016.01)
    *H01F 27/255*     (2006.01)
    *H01F 27/28*     (2006.01)
    *H02J 17/00*     (2006.01)
    *H02J 5/00*     (2016.01)
    *H02J 7/02*     (2016.01)

(52) U.S. Cl.
    CPC .............. *H01F 38/14* (2013.01); *H02J 5/005* (2013.01); *H02J 7/025* (2013.01); *H02J 17/00* (2013.01); *H02J 50/12* (2016.02); *H02J 50/50* (2016.02); *H02J 50/70* (2016.02)

(58) Field of Classification Search
    CPC .. H02J 50/50; H02J 50/70; H02J 5/005; H02J 7/025; H02J 17/00
    See application file for complete search history.

(56) References Cited

U.S. PATENT DOCUMENTS

| | | |
|---|---|---|
| 2007/0221297 A1 | 9/2007 | Matsukawa et al. |
| 2010/0007215 A1 | 1/2010 | Sakuma |
| 2011/0050382 A1 | 3/2011 | Baarman et al. |
| 2011/0304217 A1 | 12/2011 | Yamamoto et al. |
| 2012/0049991 A1* | 3/2012 | Baarman ............. H01F 17/0013 336/199 |
| 2013/0015718 A1 | 1/2013 | Jung et al. |
| 2013/0119779 A1 | 5/2013 | Jung |
| 2015/0054455 A1 | 2/2015 | Kim et al. |
| 2016/0315497 A1 | 10/2016 | Kim et al. |

FOREIGN PATENT DOCUMENTS

| | | |
|---|---|---|
| CN | 102280945 A | 12/2011 |
| CN | 202872473 U | 4/2013 |
| EP | 0986073 A1 | 3/2000 |
| JP | 8-148360 A | 6/1996 |
| JP | 2005-240138 A | 9/2005 |
| JP | 2007-266031 A | 10/2007 |
| JP | 2008-235860 A | 10/2008 |
| JP | 2009-266960 A | 11/2009 |
| JP | 2012-204440 A | 10/2012 |
| JP | 2013-70606 A | 4/2013 |
| JP | 2013-535815 A | 9/2013 |
| KR | 10-2013-0081620 A | 7/2013 |
| KR | 10-2013-0081629 A | 7/2013 |
| WO | WO 2013/035281 A1 | 3/2013 |
| WO | WO 2013/105776 A1 | 7/2013 |
| WO | WO 2013/165166 A1 | 11/2013 |

* cited by examiner

WIRELESS POWER TRANSMITTING APPARATUS

CROSS-REFERENCE TO RELATED APPLICATION

This application is a Continuation of co-pending U.S. application Ser. No. 15/835,009, filed on Dec. 7, 2017, which is a Continuation of U.S. application Ser. No. 14/677, 164, filed on Apr. 2, 2015 (now U.S. Pat. No. 9,871,383 issued on Jan. 16, 2018), which claims priority under 35 U.S.C. § 119 (a) to Korean Patent Application No. 10-2014-0040009, filed on Apr. 3, 2014, all of which are hereby expressly incorporated by reference into the present application.

BACKGROUND

1. Field of the Invention

The present invention relates to wireless charging, and more specifically, a wireless power transmitting apparatus included in a wireless charging system.

2. Discussion of Related Art

As a wireless communications technology is advancing, a wireless power transmitting/receiving technology which wirelessly transmits power to electronic devices have been receiving more attention. This wireless power transmitting/receiving technology may be diversely applied not only to battery charging of mobile terminals, but also to delivery of power to home appliances, electric cars, or subways.

The wireless power transmitting/receiving technology uses a fundamental principle of magnetic induction or magnetic resonance. A wireless power transmitting apparatus uses the fundamental principle of magnetic induction or magnetic resonance and wirelessly transmits power to a wireless power receiving apparatus. Here, a transmitting antenna of the wireless power transmitting apparatus may include a metal substrate, a soft magnetic substrate disposed on the metal substrate, and a transmitting coil disposed on the soft magnetic substrate.

In this case, in order to increase the efficiencies of power transmission and reception, it is necessary to minimize a power loss between the wireless power transmitting apparatus and the wireless power receiving apparatus.

SUMMARY OF THE INVENTION

Embodiments of the present invention provide a structure of a soft magnetic substrate of a wireless power transmitting apparatus.

According to an aspect of the present invention, a wireless power transmitting apparatus of a wireless charging system includes a transmitting coil and a soft magnetic substrate having one side configured to accommodate the transmitting coil, and a groove corresponding to a shape of the transmitting coil is formed in the one side configured to accommodate the transmitting coil.

The groove may include a wall configured to surround an outer circumference of the transmitting coil.

The groove may include at least one protruding face.

The protruding face may be surrounded by an inner circumference of the transmitting coil.

The transmitting coil may include a first transmitting coil, a second transmitting coil disposed parallel to the first transmitting coil, and a third transmitting coil disposed on the first transmitting coil and the second transmitting coil.

The groove may include a wall configured to surround at least a part of an outer circumference of the first transmitting coil, at least a part of an outer circumference of the second transmitting coil, and at least a part of an outer circumference of the third transmitting coil.

The groove may further include a first protruding face surrounded by an inner circumference of the first transmitting coil and the outer circumference of the third transmitting coil, a second protruding face surrounded by an inner circumference of the second transmitting coil and the outer circumference of the third transmitting coil, and a third protruding face surrounded by the outer circumference of the first transmitting coil, the outer circumference of the second transmitting coil, and an inner circumference of the third transmitting coil.

Induction grooves configured to induce terminals of the first transmitting coil, the second transmitting coil, and the third transmitting coil may be further formed in the wall.

The soft magnetic substrate may include a composite having a metal powder and a polymer resin.

The composite may include at least one of Fe—Si—Al alloy powder/flakes and Fe—Si—Cr alloy powder/flakes and at least one among a polyvinyl (PV) based resin, a polyethylene (PE) based resin, and a polypropylene (PP) based resin.

The soft magnetic substrate may be integrally formed through an injection molding of the composite.

According to another aspect of the present invention, a soft magnetic substrate of a wireless power transmitting apparatus includes a side configured to accommodate a transmitting coil, wherein a groove corresponding to a shape of the transmitting coil is formed in the side configured to accommodate the transmitting coil.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
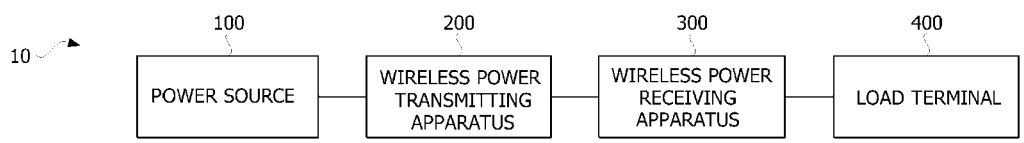
FIG. 1 is a diagram of a wireless charging system according to an embodiment of the present invention.

While the invention is susceptible to various modifications and alternative embodiments, specific embodiments thereof are shown by way of example in the drawings and will be described. However, it should be understood that there is no intention to limit the invention to the particular embodiments disclosed, but on the contrary, the invention is to cover all modifications, equivalents, and alternatives falling within the spirit and scope of the invention.

It will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the associated listed items.

When an element is referred to as being "connected to" or "coupled with" another element, not only it can be directly connected or coupled to the other element, but also it can be understood that intervening elements may be present. In contrast, when an element is referred to as being "directly connected to" or "directly coupled with" another element, there are no intervening elements present. Like numerals refer to like elements throughout.

The terminology used herein is for the purpose of describing particular embodiments only and is not intended to be limiting of the present inventive concept. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, and regardless of numbers in the drawings, the same or corresponding elements will be assigned with the same numbers and overlapping descriptions will be omitted.

FIG. 1 is a diagram of a wireless charging system according to an embodiment of the present invention.

Referring to FIG. 1, a wireless charging system 10 includes a power source 100, a wireless power transmitting apparatus 200, a wireless power receiving apparatus 300, and a load terminal 400.

The wireless power transmitting apparatus 200 is connected to the power source 100 and receives power from the power source 100. Further, the wireless power transmitting apparatus 200 wirelessly transmits power to the wireless power receiving apparatus 300. In this case, the wireless power transmitting apparatus 200 may transmit power using an electromagnetic induction method or a resonance method.

The wireless power receiving apparatus 300 wirelessly receives power from the wireless power transmitting apparatus 200. The wireless power receiving apparatus 300 may also receive power using the electromagnetic induction method or the resonance method. Further, the wireless power receiving apparatus 300 provides a received power to the load terminal 400.

Figure 2:
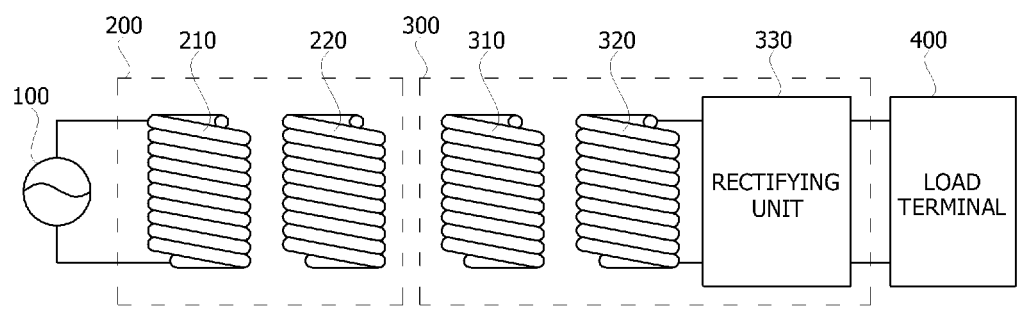
FIG. 2 is a view illustrating a method of wireless power transmission and reception for a wireless charging system according to an embodiment of the present invention.

FIG. 2 is a view illustrating a method of wireless power transmission and reception for a wireless charging system according to an embodiment of the present invention.

Referring to FIG. 2, a wireless power transmitting apparatus 200 may include a transmitting induction coil 210 and a transmitting resonance coil 220. A wireless power receiving apparatus 300 may include a receiving resonance coil 310, a receiving induction coil 320, and a rectifying unit 330.

A power source 100 may generate alternating current (AC) power having a predetermined frequency and supply AC power to the transmitting induction coil 210 of the wireless power transmitting apparatus 200.

Further, AC generated by the transmitting induction coil 210 may be induced in the transmitting resonance coil 220 which is inductively coupled with the transmitting induction coil 210. Then, power delivered to the transmitting resonance coil 220 may be transferred to the wireless power receiving apparatus 300 having the same resonance frequency as the wireless power transmitting apparatus 200 through a frequency resonance method.

Power may be transferred between two impedance matched LC circuits through a resonance.

Accordingly, AC may flow through the receiving resonance coil 310 and may be induced in the receiving induction coil 320 inductively coupled with the receiving resonance coil 310. Power transferred to the receiving induction coil 320 may be rectified through the rectifying unit 330 and delivered to the load terminal 400.

In FIG. 2, although an example on power transfer from the wireless power transmitting apparatus 200 to the wireless power receiving apparatus 300 using the frequency resonance method is described, the example is not limited thereto. The wireless power transmitting apparatus 200 and the wireless power receiving apparatus 300 may transfer power using an electromagnetic induction method.

When power is transferred using an electromagnetic induction method, the transmitting resonance coil 220 included in the wireless power transmitting apparatus 200 and the receiving resonance coil 310 included in the wireless power receiving apparatus 300 of FIG. 2 may be omitted.

Figure 3:
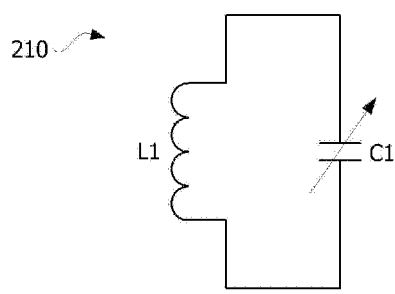
FIG. 3 is an equivalent circuit diagram of a transmitting induction coil according to an embodiment of the present invention.

FIG. 3 is an equivalent circuit diagram of a transmitting induction coil according to an embodiment of the present invention.

Referring to FIG. 3, a transmitting induction coil 210 includes an inductor L1 and a capacitor C1, and both ends of the inductor L1 may be connected to both ends of the capacitor C1, respectively.

Here, the capacitor C1 may be a variable capacitor, and an impedance matching may be performed as a capacitance of the capacitor C1 is adjusted. Although equivalent circuit diagrams of a transmitting resonance coil 220, a receiving resonance coil 310, and a receiving induction coil 320 may also be similar to an equivalent circuit diagram of the transmitting induction coil 210, the equivalent circuit diagrams are not limited thereto.

Figure 4:
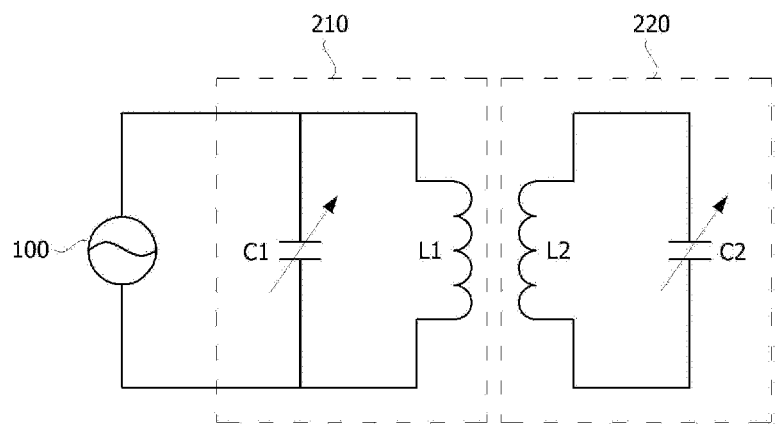
FIG. 4 is an equivalent circuit diagram of a power source and a wireless power transmitting apparatus according to an embodiment of the present invention.

FIG. 4 is an equivalent circuit diagram of a power source and a wireless power transmitting apparatus according to an embodiment of the present invention.

Referring to FIG. 4, a transmitting induction coil 210 and a transmitting resonance coil 220 may include inductors L1 and L2 having inductance values, respectively, and capacitors C1 and C2 having capacitance values, respectively.

Figure 5:
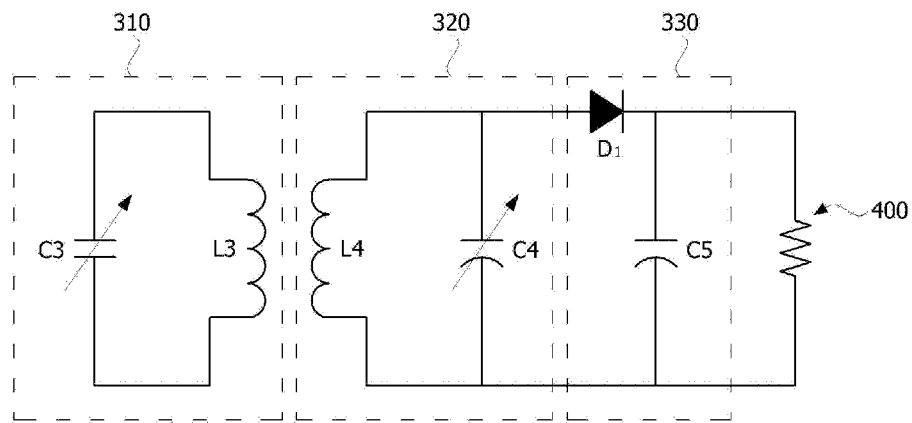
FIG. 5 is an equivalent circuit diagram of a wireless power receiving apparatus according to an embodiment of the present invention.

FIG. 5 is an equivalent circuit diagram of a wireless power receiving apparatus according to an embodiment of the present invention.

Referring to FIG. 5, a receiving resonance coil 310 and a receiving induction coil 320 may include inductors L3 and L4 having inductance values, respectively, and capacitors C3 and C4 having capacitance values, respectively.

A rectifying unit 330 may convert AC power delivered from the receiving induction coil 320 into direct current (DC) power, and deliver the converted DC power to a load terminal 400.

Specifically, the rectifying unit 330 may include a rectifier and a smoothing circuit which are not shown. Although the rectifier (e.g., it may be a silicon rectifier) may be equivalently represented as a diode D1, the rectifier is not limited thereto. The rectifier may convert AC power delivered from the receiving induction coil 320 into DC power. The smoothing circuit may remove an alternating element included in the DC power converted in the rectifier and output smooth DC power. Although the smoothing circuit, for example, may be equivalently represented as a capacitor C5, the smoothing circuit is not limited thereto.

The load terminal 400 may be a battery or a device with a built-in battery.

Meanwhile, the quality factor carries an important meaning in a wireless power transmission. The quality factor (Q) indicates an index of energy which may be accumulated around a wireless power transmitting apparatus 200 or a wireless power receiving apparatus 300. The quality factor (Q) may vary depending on an operating frequency (w), a shape of a coil, a size, a material, etc., and may be represented as the following Equation 1.

$$Q=w*Ls/Rs \quad \text{[Equation 1]}$$

Here, Ls is a coil inductance, and Rs indicates a resistance corresponding to a power loss occurred in the coil itself.

The quality factor (Q) may have a value from 0 to infinity, and as the quality factor (Q) becomes greater, high efficiency of a power transmission between the wireless power transmitting apparatus 200 and the wireless power receiving apparatus 300 may be achieved.

According to an embodiment of the present invention, it is intended to increase the quality factor (Q) by accommodating a transmitting coil in a groove formed in a soft magnetic substrate.

Figure 6:
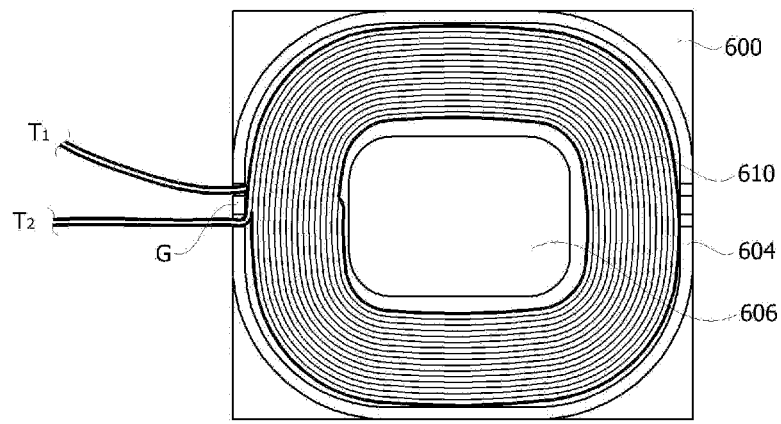
FIG. 6 is a top view of a soft magnetic substrate and a transmitting coil included in a wireless power transmitting apparatus according to an embodiment of the present invention.
Figure 7:
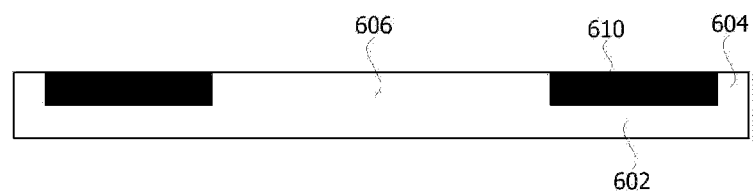
FIG. 7 is a cross-sectional view of a soft magnetic substrate and a transmitting coil according to an embodiment of the present invention.
Figure 8:
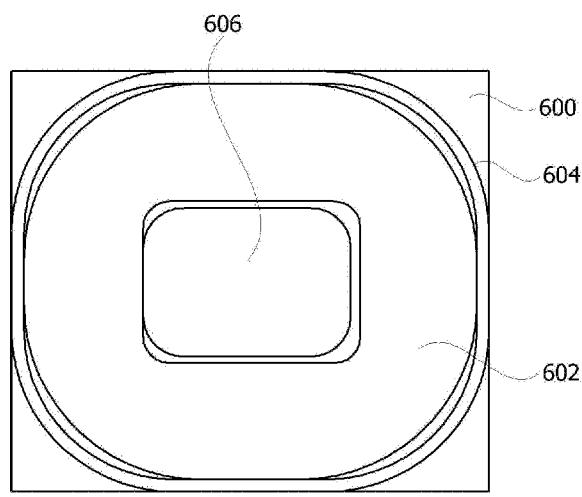
FIG. 8 is a top view of a soft magnetic substrate according to an embodiment of the present invention.
Figure 9:
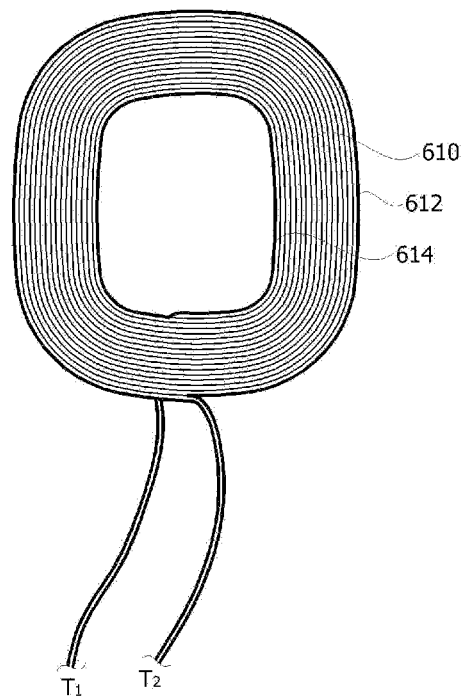
FIG. 9 is a top view of a transmitting coil according to an embodiment of the present invention.

FIG. 6 is a top view of a soft magnetic substrate and a transmitting coil included in a wireless power transmitting apparatus according to an embodiment of the present invention. FIG. 7 is a cross-sectional view of a soft magnetic substrate and a transmitting coil according to an embodiment of the present invention. FIG. 8 is a top view of a soft magnetic substrate according to an embodiment of the present invention. FIG. 9 is a top view of a transmitting coil according to the embodiment of the present invention. Here, the transmitting coil may be at least one of a transmitting induction coil and a transmitting resonance coil.

Referring to FIGS. 6 to 9, a soft magnetic substrate 600 accommodates a transmitting coil 610. As shown in FIG. 9, the transmitting coil 610 may have a wire wound shape such as a spiral or helical shape on a plane. Although the transmitting coil 610 may have a round shape, a racetrack shape, a rectangular shape, a triangular shape, or a shape of a rounded corner polygon, the transmitting coil 610 is not limited thereto.

In order for the soft magnetic substrate 600 to accommodate the transmitting coil 610, a groove corresponding to a shape of the transmitting coil 610 may be formed in one side of the soft magnetic substrate 600. The groove may include an accommodating face 602 in which one side of the transmitting coil 610 is disposed, and a wall 604 configured to surround an outer circumference 612 of the transmitting coil 610. When a wall 604 of the soft magnetic substrate 600 surrounds the outer circumference 612 of the transmitting coil 610, a magnetic flux toward a side of the transmitting coil 610 is reduced by a shielding effect of the wall 604, and a magnetic flux toward a direction of a receiving coil becomes greater. Thus, power transmission efficiency between a wireless power transmitting apparatus and a wireless power receiving apparatus becomes greater. Further, since the wall 604 of the soft magnetic substrate 600 prevents separation of the transmitting coil 610, durability of the wireless power transmitting apparatus may be increased. Accordingly, a height of the wall 604 may be ½ to 2 times a thickness of the transmitting coil 610.

A groove of the soft magnetic substrate 600 may further include a protruding face 606. The protruding face 606 may be surrounded by an inner circumference 614 of the transmitting coil 610. That is, the protruding face 606 may protrude within an empty region in the middle of the transmitting coil 610. As described above, when the protruding face 606 is surrounded by the inner circumference 614 of the transmitting coil 610, a magnetic flux toward a side of the transmitting coil 610 is reduced due to shielding effect of the protruding face 606, and a magnetic flux toward a direction of the receiving coil becomes greater. Further, since magnetism of the protruding face 606 becomes stronger as an area of the protruding face 606 becomes greater, a recognition rate of the wireless power receiving apparatus may be increased.

Meanwhile, an induction groove G configured to induce terminals T1 and T2 of the transmitting coil 610 may be further formed in the wall 604 of the soft magnetic substrate 600.

Figure 10:
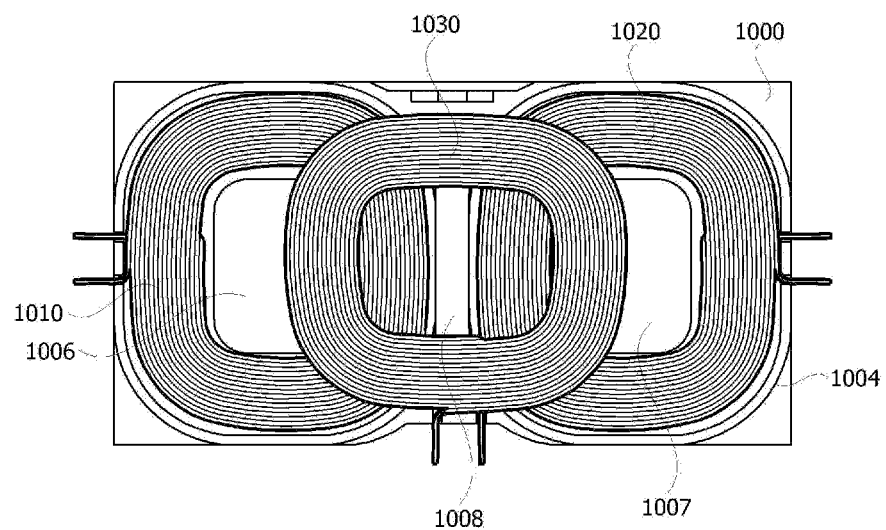
FIG. 10 is a top view of a soft magnetic substrate and a transmitting coil included in a wireless power transmitting apparatus according to another embodiment of the present invention.
Figure 11:
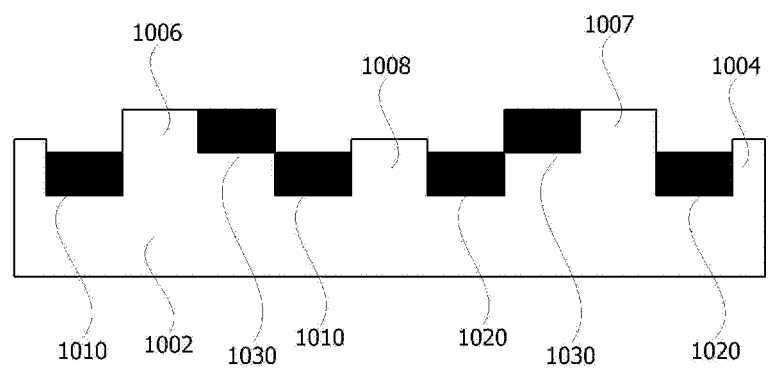
FIG. 11 is a cross-sectional view of a soft magnetic substrate and a transmitting coil according to another embodiment of the present invention.
Figure 12:
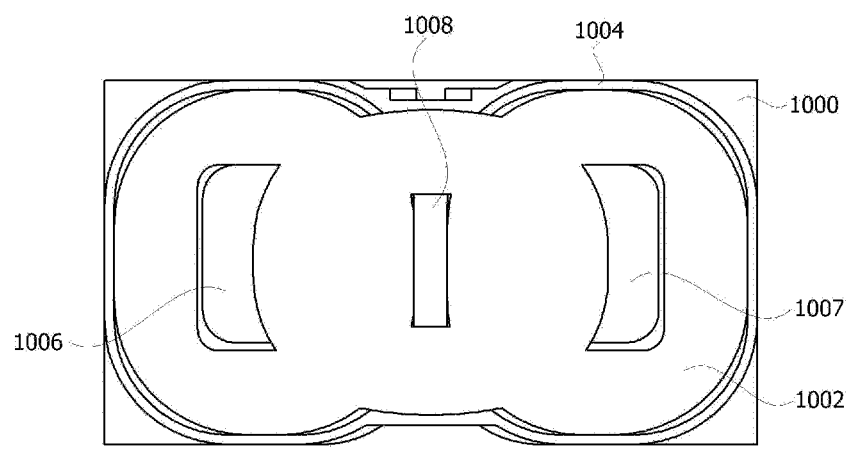
FIG. 12 is a top view of a soft magnetic substrate according to another embodiment of the present invention.
Figure 13:
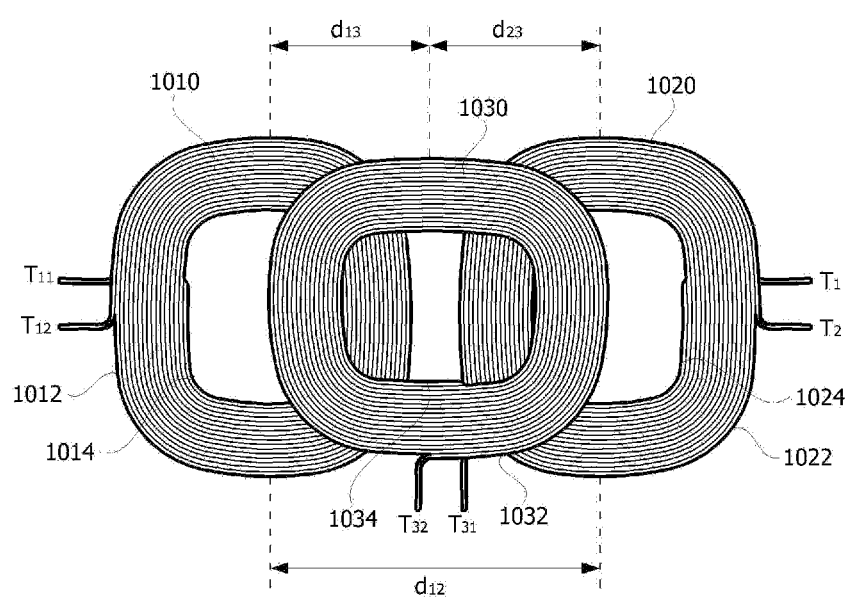
FIG. 13 is a top view of a transmitting coil according to another embodiment of the present invention.

FIG. 10 is a top view of a soft magnetic substrate and a transmitting coil included in a wireless power transmitting apparatus according to another embodiment of the present invention. FIG. 11 is a cross-sectional view of a soft magnetic substrate and a transmitting coil according to another embodiment of the present invention. FIG. 12 is a top view of a soft magnetic substrate according to another embodiment of the present invention. FIG. 13 is a top view of a transmitting coil according to another embodiment of the present invention. Here, the transmitting coil may be at least one of a transmitting induction coil and a transmitting resonance coil.

Referring to FIGS. 10 to 13, a soft magnetic substrate 1000 accommodates transmitting coils 1010, 1020, and 1030. As shown in FIG. 13, the transmitting coils 1010, 1020, and 1030 may each have a wire wound shape such as a spiral or helical shape on a plane. Although the transmitting coils 1010, 1020, and 1030 may each have a round shape, a racetrack shape, a rectangular shape, a triangular shape, or a shape of a rounded corner polygon, those are not limited thereto. The transmitting coil 1010 and the transmitting coil 1020 are disposed in parallel, and a center of the transmitting coil 1010 and a center of the transmitting coil 1020 may have a predetermined distance d12. Further, the transmitting coil 1030 may be disposed on the transmitting coil 1010 and the transmitting coil 1020. For example, the transmitting coil 1030 may be disposed to be orthogonal to the transmitting coil 1010 and the transmitting coil 1020, and the center of the transmitting coil 1010 and a center of the transmitting coil 1030 may have a predetermined distance d13, and the center of the transmitting coil 1020 and the center of the transmitting coil 1030 may have a predetermined distance d23.

In order for the soft magnetic substrate 1000 to accommodate the transmitting coils 1010, 1020, and 1030, a groove corresponding to a shape of the disposed transmitting coils 1010, 1020, and 1030 may be formed in one side of the soft magnetic substrate 1000. The groove may include an accommodating face 1002 in which each one side of the transmitting coils 1010 and 1020 is disposed, and a wall 1004 configured to surround outer circumferences 1012, 1022, and 1032 of the transmitting coil 1010, 1020, and 1030. For example, the wall 1004 may surround at least a part of the outer circumference 1012 of the transmitting coil 1010, at least a part of the outer circumference 1022 of the transmitting coil 1020, and at least a part of the outer circumference 1032 of the transmitting coil 1030. When a wall 1004 of the soft magnetic substrate 1000 surrounds the outer circumferences 1012, 1022, and 1032 of the transmitting coils 1010, 1020, and 1030, magnetic fluxes toward sides of the transmitting coils 1010, 1020, and 1030 are reduced due to shielding effect of the wall 1004, and a magnetic flux toward a direction of a receiving coil becomes greater. Thus, power transmission efficiency between a wireless power transmitting apparatus and a wireless power receiving apparatus becomes greater. Further, since the wall 1004 of the soft magnetic substrate 1000 prevents separation of the transmitting coils 1010, 1020, and 1030, durability of the wireless power transmitting apparatus may be increased. Accordingly, a height of the wall 1004 may be ½ to 2 times each thickness of the transmitting coils 1010, 1020, and 1030.

A groove of the soft magnetic substrate 1000 may further include at least one of protruding faces 1006, 1007, and 1008. The protruding face 1006 may be surrounded by an inner circumference 1014 of the transmitting coil 1010 and an outer circumference 1032 of the transmitting coil 1030, and the protruding face 1007 may be surrounded by an inner circumference 1024 of the transmitting coil 1020 and the outer circumference 1032 of the transmitting coil 1030, and the protruding face 1008 may be surrounded by an outer circumference 1012 of the transmitting coil 1010, an outer circumference 822 of the transmitting coil 1020 and an inner circumference 1034 of the transmitting coil 1030. As described above, when the protruding faces 1006, 1007, and 1008 are surrounded by the transmitting coils 1010, 1020, and 1030, a magnetic flux toward each side of the transmitting coils 1010, 1020, and 1030 is reduced due to shielding effect of the protruding faces 1006, 1007, and 1008, and a magnetic flux toward a direction of a receiving coil becomes greater. Further, since magnetism of the protruding faces 1006, 1007, and 1008 becomes stronger as areas of the protruding faces 1006, 1007, and 1008 become greater, a recognition rate of the wireless power receiving apparatus may be increased.

Meanwhile, in the wall 1004 of the soft magnetic substrate 1000, induction grooves configured to induce terminals T11, T12, T21, T22, T31, and T32 of the transmitting coils 1010, 1020, and 1030 may be further formed. In this case, the induction grooves configured to induce the terminals T11 and T12 of the transmitting coil 1010 and the induction grooves configured to induce the terminals T21 and T22 of the transmitting coil 1020 may be formed in a wall orthogonal to a wall in which the induction grooves configured to induce the terminals T31 and T32 of the transmitting coil 1030 are formed. Accordingly, although the transmitting coil 1030 is disposed to be orthogonal to the transmitting coil 1010 and the transmitting coil 1020, a coil having the same wire wound shape may be used. Thus, a production cost may be reduced.

However, the induction groove is not limited thereto, and the induction groove may be diversely formed depending on arrangements of the transmitting coils 1010, 1020, and 1030 and a structure of the wireless power transmitting apparatus. That is, each induction groove of the transmitting coils 1010, 1020, and 1030 may be formed in the same wall, or may be formed in a different wall. Each induction groove of the transmitting coils 1010, 1020, and 1030 may be formed to pass through at least a part of the accommodating face 1002 of the soft magnetic substrate 1000.

Further, for the sake of a convenient description, although an example on one transmitting coil or three transmitting coils disposed on the soft magnetic substrate is simply described, the example is not limited thereto. Embodiments of the present invention may be also applied when two transmitting coils are disposed on the soft magnetic substrate. For example, one transmitting coil is stacked on another transmitting coil, and two transmitting coils may be arranged in a direction of a coincidental long axis. In this case, a center of each transmitting coil may have an interval of a predetermined distance. The embodiments of the present invention may be also applied when at least two transmitting coils are disposed parallel to each other in an array shape.

Meanwhile, according to the embodiment of the present invention, the soft magnetic substrate may be integrally molded through an injection molding of a single metal or a composite including an alloy powder/flakes and a polymer resin. For example, the composite may include 83 to 87 wt % of at least one of Fe—Si—Al alloy powder/flakes and Fe—Si—Cr alloy powder/flakes, and 13 to 17 wt % of at least one of a polyvinyl (PV) based resin, a polyethylene (PE) based resin and a polypropylene (PP) based resin. When the composite has the above-described composition ratio, the composite may have high temperature stability, excellent heat radiating characteristics, a light weight, and a high shock resistance.

Hereinafter, the embodiment of the present invention will be described in more detail using Embodiment and Comparative Example.

<Embodiment>

A composite mixed with 83 to 87 wt % of powder/flakes of an alloy including Fe, Si, and Al or powder/flakes of an alloy including Fe, Si, and Cr and 13 to 17 wt % of a PV based resin is injected and calendared, and a soft magnetic substrate having a shape of FIG. 12 is produced.

Comparitive Example

After mixing 99 wt % of Ni—Zn based ferrite or Mn-Zn based ferrite with 1 wt % of a PVA based resin, a planar soft magnetic substrate is produced by sintering at a temperature in a range of 1100° C. to 1300° C.

Table 1 compares characteristics of soft magnetic substrates produced from Embodiment and Comparative Example, and table 2 compares quality factors (Q) after disposing transmitting coils on the soft magnetic substrates produced from Embodiment and Comparative Example as in FIG. 10.

TABLE 1

| Characteristics | Embodiment (Composite) | Comparative Example (Pellet) |
|---|---|---|
| Permeability | around 50 | around 3,000 |
| Permeability change/temperature (-20 to +50° C.) | around 200 ppm/° C. | around 9,500 ppm/° C. |
| Core loss (@ 150 kHz, 50 mT) | around 150 W/cc | around 200 W/cc |
| Thermal conductivity | around 4 W/mK | around 1 W/mK |
| Density | 3.8 g/cc | 5.0 g/cc |
| Drop-test | normal at 3 m height | broken at 0.5 m height |
| Hardness | ≥9 H | ≥9 H |
| Salt spray (KSC0223:1990, 48 hr) | pass | pass |
| High temperature and High humidity (85° C., 85%, 96 hr) | pass | pass |
| PCT (High temperature/High pressure/High humidity, 121° C. /2 Atmospheric pressure/100%, 12 hr) | pass | pass |
| Machineability | complex shape possible | simple shape |

TABLE 2

| Transmitting coil | Measured Parameter | Embodiment | Comparative Example |
|---|---|---|---|
| Transmitting coil (810) | Ls (μH) | 11.549 | 12.445 |
| | Rs (mΩ) | 64.71 | 92.02 |
| | Q | 113.62 | 84.92 |
| | Cs (nF) | 219.3 | 203.51 |
| Transmitting coil (820) | Ls (μH) | 12.309 | 12.894 |
| | Rs (mΩ) | 62.77 | 91.74 |
| | Q | 123.92 | 88.28 |
| | Cs (nF) | 205.51 | 196.47 |
| Transmitting coil (830) | Ls (μH) | 12.264 | 12.624 |
| | Rs (mΩ) | 62.21 | 93.52 |
| | Q | 123.41 | 84.62 |
| | Cs (nF) | 206.56 | 200.67 |

As shown in table 1, the composite according to the embodiment of the present invention (i.e., Embodiment) has an excellent temperature stability and heat radiating characteristics compared to the pellet in Comparative Example. Further, the composite according to the embodiment of the present invention has a lighter weight, higher solidity, and an easier molding process compared to the pellet in Comparative Example.

Accordingly, since the transmitting coil accommodated on the soft magnetic substrate according to the embodiment of the present invention may have a higher Q value and a lower Rs value compared to the transmitting coil disposed on the soft magnetic substrate in Comparative Example, a power loss may be reduced and a wireless power transmitting apparatus having a high shock resistance may be obtained.

According to embodiments of the present invention, the quality factor (Q) can be increased, and efficiencies of power transmission and reception between a wireless power transmitting apparatus and a wireless power receiving apparatus can be increased.

Further, by improving elasticity and shock resistance of a soft magnetic substrate on which a transmitting coil is disposed, a breakage phenomenon of the soft magnetic substrate can be reduced.

Although exemplary embodiments of the present invention have been referenced and described above, it will be understood that it is possible for those of ordinary skill in the art to implement modifications and variations on the present invention without departing from the concept and scope of the present invention listed in the following appended claims.

What is claimed is:

1. A wireless power transmitting apparatus, comprising:
   a first transmitting coil;
   a second transmitting coil;
   a third transmitting coil on the first transmitting coil and the second transmitting coil; and
   a substrate to accommodate the first transmitting coil, the second transmitting coil, and the third transmitting coil,
   wherein the substrate comprises:
   a wall to surround a part of an outer circumference of the first transmitting coil and a part of an outer circumference of the second transmitting coil;
   a first protrusion inside an inner circumference of the first transmitting coil; and
   a second protrusion inside an inner circumference of the second transmitting coil,
   wherein the third transmitting coil is disposed between the first protrusion and the second protrusion,
   wherein the first protrusion comprises a first stepped portion to support the third transmitting coil, and
   wherein the second protrusion comprises a second stepped portion to support the third transmitting coil.

2. The wireless power transmitting apparatus of claim 1, wherein the substrate comprises a third protrusion disposed between the first transmitting coil and the second transmitting coil.

3. The wireless power transmitting apparatus of claim 2, wherein the third protrusion is disposed in an inner circumference of the third transmitting coil.

4. The wireless power transmitting apparatus of claim 2, wherein a width of the third protrusion is less than a width of the first protrusion and a width of the second protrusion.

5. The wireless power transmitting apparatus of claim 1, wherein terminals of the third transmitting coil are disposed between the first transmitting coil and the second transmitting coil.

6. The wireless power transmitting apparatus of claim 1, wherein the substrate is a soft magnetic substrate.

7. A wireless power transmitting apparatus, comprising:
a first transmitting coil;
a second transmitting coil;
a third transmitting coil on the first transmitting coil and the second transmitting coil; and
a substrate to accommodate the first transmitting coil, the second transmitting coil, and the third transmitting coil,
wherein the substrate comprises:
a first protrusion inside an inner circumference of the first transmitting coil; and
a second protrusion inside an inner circumference of the second transmitting coil,
wherein the third transmitting coil is disposed between the first protrusion and the second protrusion,
wherein the first protrusion comprises a first stepped portion to support the third transmitting coil, and
wherein the second protrusion comprises a second stepped portion to support the third transmitting coil.

8. The wireless power transmitting apparatus of claim 7, wherein the substrate comprises a third protrusion disposed between the first transmitting coil and the second transmitting coil.

9. The wireless power transmitting apparatus of claim 8, wherein the third protrusion is disposed in an inner circumference of the third transmitting coil.

10. The wireless power transmitting apparatus of claim 8, wherein a width of the third protrusion is less than a width of the first protrusion and a width of the second protrusion.

11. The wireless power transmitting apparatus of claim 7, wherein terminals of the third transmitting coil are disposed between the first transmitting coil and the second transmitting coil.

12. The wireless power transmitting apparatus of claim 7, wherein the substrate is a soft magnetic substrate.

13. A wireless power transmitting apparatus, comprising:
a first transmitting coil;
a second transmitting coil;
a third transmitting coil on the first transmitting coil and the second transmitting coil; and
a substrate to accommodate the first transmitting coil, the second transmitting coil, and the third transmitting coil,
wherein the substrate comprises:
a first protrusion inside an inner circumference of the first transmitting coil; and
a second protrusion inside an inner circumference of the second transmitting coil,
wherein the first protrusion comprises a first stepped portion to support the third transmitting coil, and
wherein the second protrusion comprises a second stepped portion to support the third transmitting coil.

14. The wireless power transmitting apparatus of claim 13, wherein the substrate comprises a third protrusion disposed between the first transmitting coil and the second transmitting coil.

15. The wireless power transmitting apparatus of claim 14, wherein the third protrusion is disposed in an inner circumference of the third transmitting coil.

16. The wireless power transmitting apparatus of claim 14, wherein a width of the third protrusion is less than a width of the first protrusion and a width of the second protrusion.

17. The wireless power transmitting apparatus of claim 13, wherein terminals of the third transmitting coil are disposed between the first transmitting coil and the second transmitting coil.

18. The wireless power transmitting apparatus of claim 13, wherein the substrate is a soft magnetic substrate.

* * * * *